(12) United States Patent
Emlind et al.

(10) Patent No.: US 9,316,252 B2
(45) Date of Patent: Apr. 19, 2016

(54) METHOD AND A SYSTEM FOR ESTABLISHING AND EXECUTING CORRECT AUTOMATIC RELUBRICATION FOR A NUMBER OF BEARINGS

(75) Inventors: Roger Emlind, Alingsäs (SE); Hans Hansson, Sävedalen (SE); Björn Mathiasson, Göteborg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 779 days.

(21) Appl. No.: 13/392,195

(22) PCT Filed: Aug. 26, 2010

(86) PCT No.: PCT/SE2010/000210
§ 371 (c)(1),
(2), (4) Date: May 11, 2012

(87) PCT Pub. No.: WO2011/025430
PCT Pub. Date: Mar. 3, 2011

(65) Prior Publication Data
US 2012/0221153 A1  Aug. 30, 2012

(30) Foreign Application Priority Data

Aug. 27, 2009  (SE) .................................... 0901128

(51) Int. Cl.
| F16C 19/00 | (2006.01) |
| F16C 19/52 | (2006.01) |
| F01M 1/14 | (2006.01) |
| F16C 33/66 | (2006.01) |
| G01M 13/04 | (2006.01) |

(52) U.S. Cl.
CPC .................. *F16C 19/52* (2013.01); *F01M 1/14* (2013.01); *F16C 33/6625* (2013.01); *G01M 13/04* (2013.01); *G01M 13/045* (2013.01); *F16C 2233/00* (2013.01)

(58) Field of Classification Search
None
See application file for complete search history.

(56) References Cited

U.S. PATENT DOCUMENTS 4,738,336 A * 4/1988 Smith et al. .................... 184/6.4
5,060,760 A   10/1991 Long et al.
(Continued)

FOREIGN PATENT DOCUMENTS

EP  1277977 A1  1/2003

*Primary Examiner* — Christopher E Everett
(74) *Attorney, Agent, or Firm* — Bryan Peckjian; SKF USA Inc. Patent Dept.

(57) ABSTRACT

A method and a system for establishing and executing correct automatic relubrication for a number of bearings incorporated in a grease lubrication system. The system determines initial values for the relubrication interval $t_f$ and/or lubricant volume utilizing data collected from the different bearing assemblies during operation. The data includes bearing load, bearing temperature and bearing rotational speed. A processor calculates a correct lubricant volume and a value for current lubrication interval $t_f$ by comparing an initial value with a current value. The calculated correct lubricant volume and current lubrication interval $t_f$ are supplying to an automatic lubricating apparatus, which functions in accordance with the determined values. The data collection and calculation procedures are repeated after each application of lubricant to the bearings.

9 Claims, 3 Drawing Sheets

(56) References Cited

U.S. PATENT DOCUMENTS

| | | | |
|---|---|---|---|
| 5,526,783 A * | 6/1996 | Ito et al. ..................... 123/196 S |
| 5,671,825 A | 9/1997 | Wong et al. |
| 5,813,496 A * | 9/1998 | Hyvonen et al. ............. 184/6.4 |
| 5,952,803 A * | 9/1999 | Canada et al. ................ 318/558 |
| 5,969,601 A * | 10/1999 | Sato et al. .................. 340/450.3 |
| 6,161,962 A * | 12/2000 | French et al. ................. 384/459 |
| 6,179,597 B1 * | 1/2001 | Ito et al. ........................ 425/107 |
| 6,196,057 B1 * | 3/2001 | Discenzo ..................... 73/54.01 |
| 6,253,601 B1 * | 7/2001 | Wang et al. ................ 73/114.55 |
| 6,286,363 B1 * | 9/2001 | Discenzo ..................... 73/53.01 |
| 6,324,899 B1 * | 12/2001 | Discenzo ..................... 73/53.05 |
| 7,017,712 B1 * | 3/2006 | Rake et al. ...................... 184/6.4 |
| 7,018,106 B2 * | 3/2006 | Okada .......................... 384/448 |
| 7,140,468 B2 * | 11/2006 | Rake et al. ................... 184/6.23 |
| 7,665,577 B2 * | 2/2010 | Javelly et al. ................ 184/15.2 |
| 2003/0015374 A1 * | 1/2003 | Matsuura et al. .............. 184/7.4 |
| 2003/0110860 A1 * | 6/2003 | Okada ............................ 73/593 |
| 2003/0115977 A1 | 6/2003 | Holweg et al. |
| 2004/0197040 A1 | 10/2004 | Walker |
| 2007/0030162 A1 * | 2/2007 | Okada et al. .................. 340/682 |

\* cited by examiner

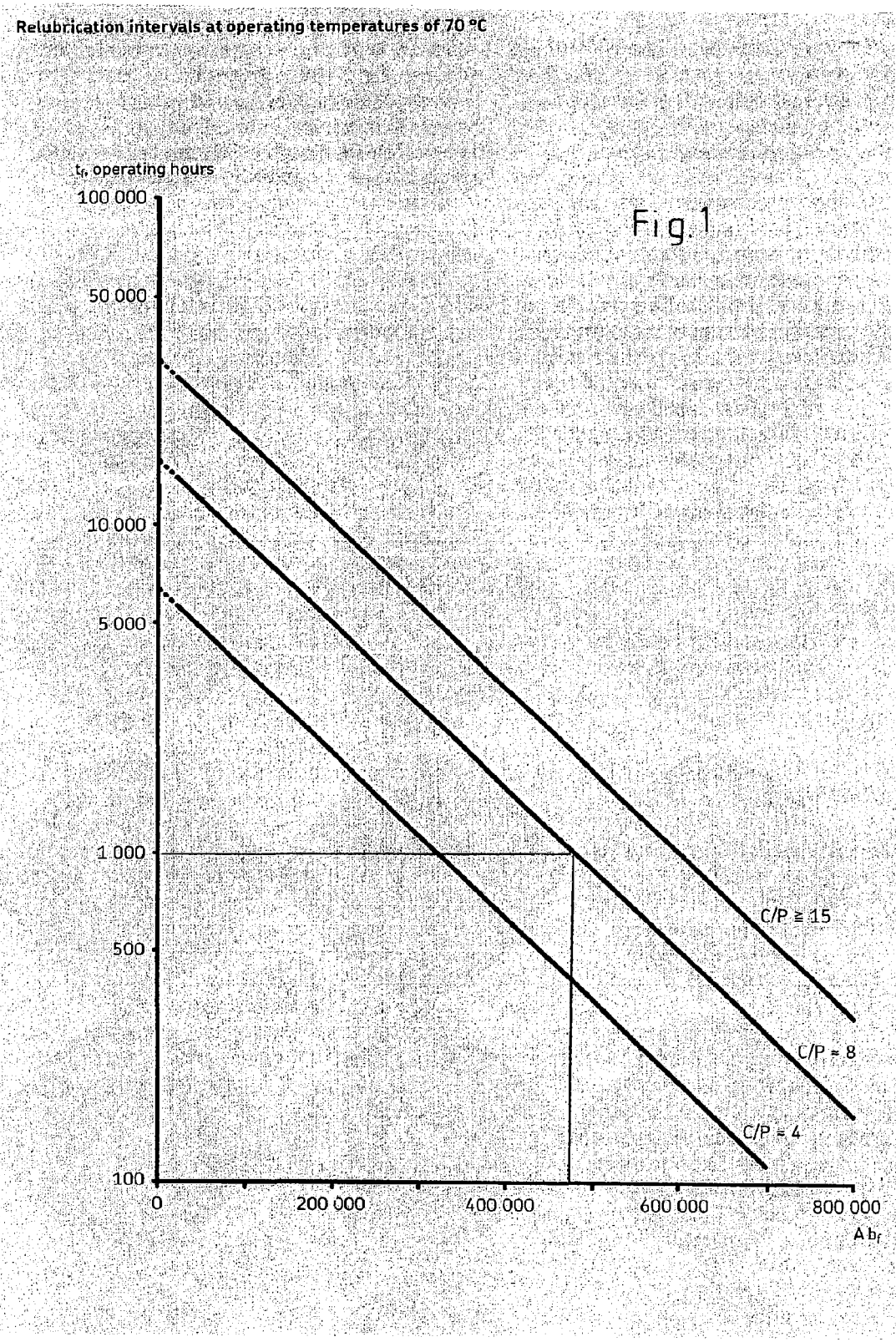
PRIOR ART

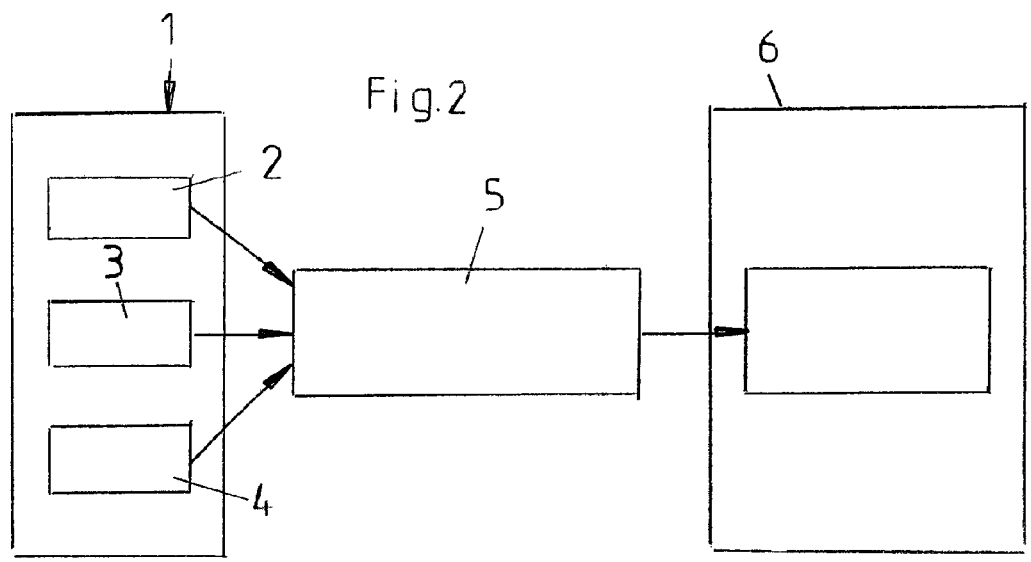
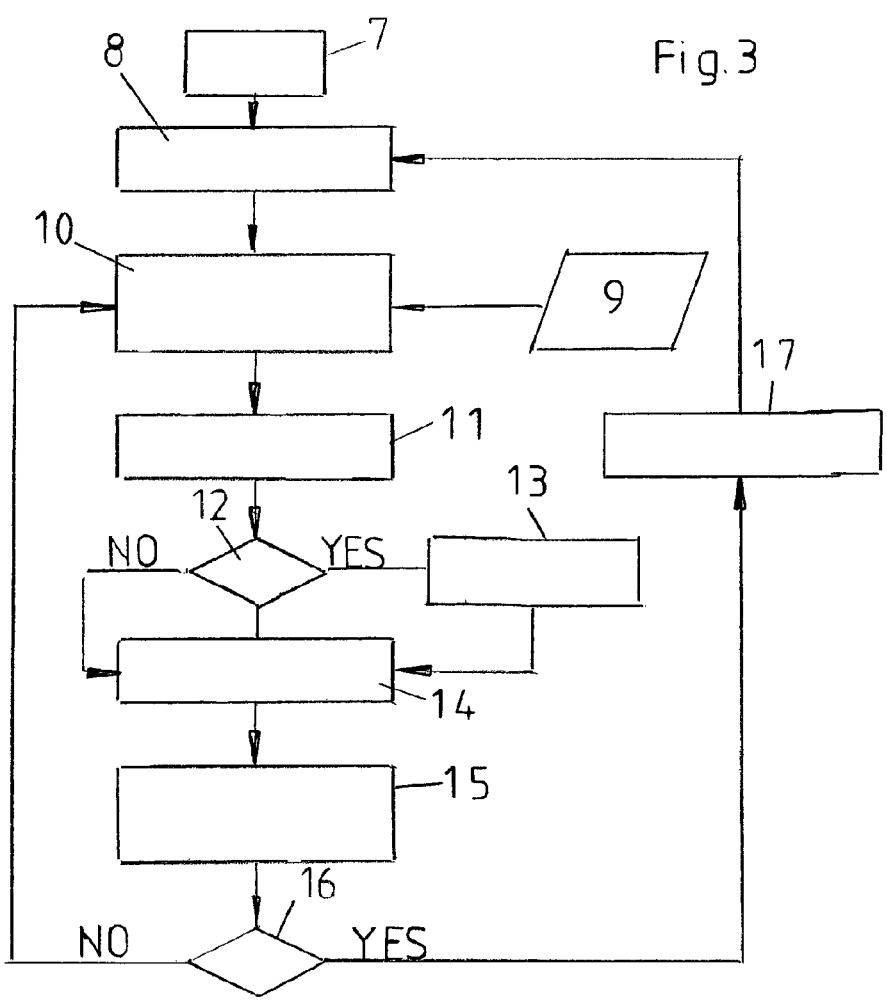

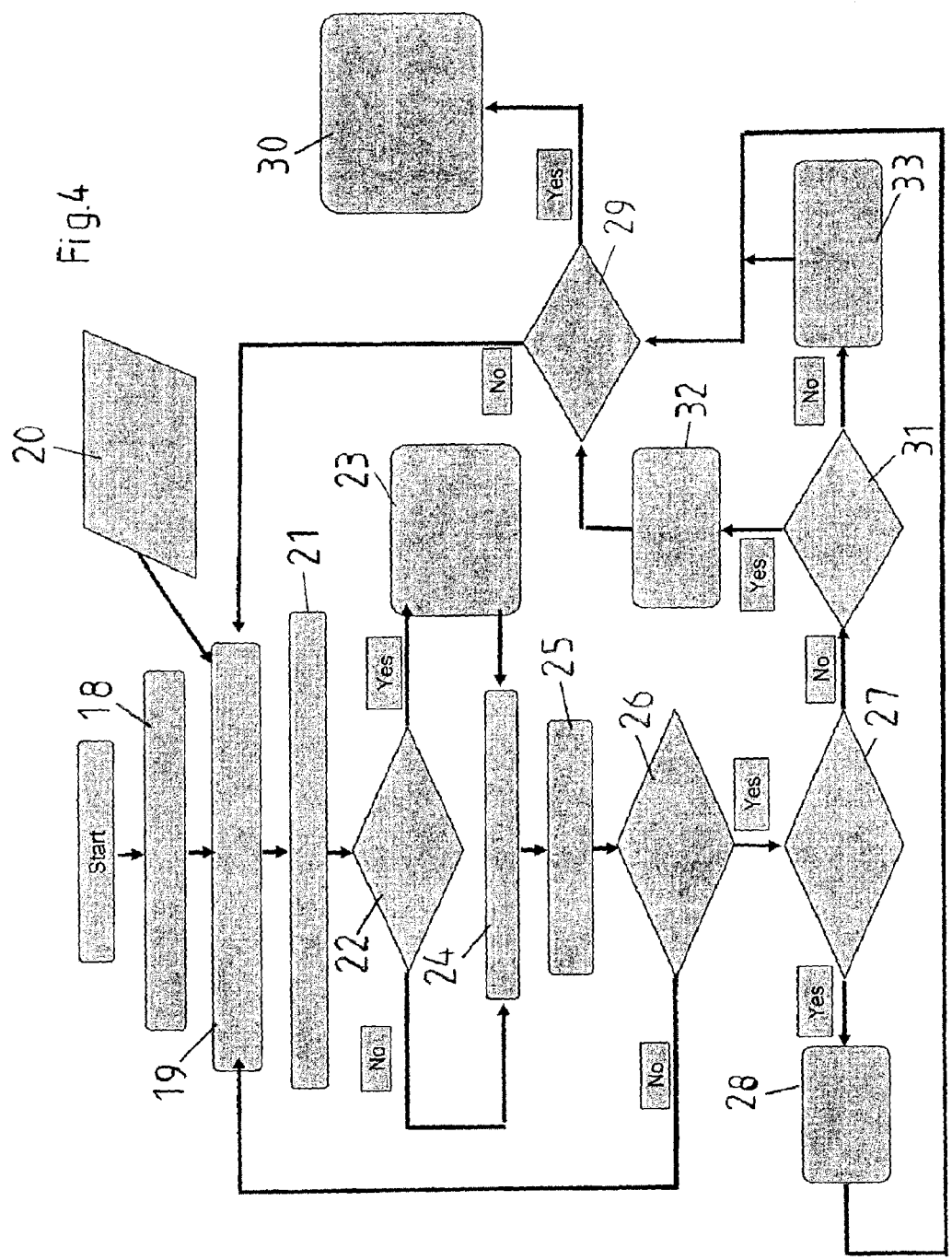

METHOD AND A SYSTEM FOR ESTABLISHING AND EXECUTING CORRECT AUTOMATIC RELUBRICATION FOR A NUMBER OF BEARINGS

CROSS-REFERENCE TO RELATED APPLICATION

This application is the US national stage of International Application No. PCT/SE2010/000210 filed on 26 Aug. 2010, which claims the benefit of Swedish Patent Application Serial No. 0901128-9, filed on 27 Aug. 2009, both of which are incorporated herein in their entireties.

FIELD OF THE INVENTION

The present invention refers to relubrication of a number of bearings, particularly for grease lubricated bearings relubricated by an automated lubrication system.

BACKGROUND OF THE INVENTION

Greases used for lubricating bearings often have a shorter service life than the expected service life for the bearings lubricated thereby. For that reason rolling bearings have to be relubricated, and relubrication shall take place at a time when the condition of the lubricant is still satisfactory.

The requirement for relubrication depends on many related factors, including bearing type and size, speed at which the bearings are running, operating temperature, type of grease, bearing environment, etcetera.

The common method for deciding the relubrication intervals $t_f$ for bearings is by using statistical rules, where for instance the SKF recommended relubrication intervals are defined as the time period, at the end of which 99% of the bearings are still reliably lubricated.

Diagrams have been created which are used for establishing the relubrication interval for a specific bearing, at a speed factor "A" multiplied by the relevant bearing factor "bf", where the graphs represent the load ratio C/P. Such a relubrication interval chart can be seen in the accompanying FIG. 1. For a bearing having a value of $Ab_f << 475000$ and a C/P ratio=8, it can be seen that the calculated $t_f$ value will be 1000 operating hours.

With this earlier and commonly used method, it is possible to decide before the operation of the bearing assembly or bearing assemblies shall be relubricated, and the method has proven itself to give a fairly satisfactory and reliable result.

However, some of the factors to be considered may change gradually during operation for the bearing assembly or bearing assemblies relubricated by the automated lubrication system.

Thus it is possible that the load acting on a bearing can change, the temperature, at which the bearing is operating, can vary for external reasons and the rotational speed can be altered. The previous method of setting the $t_f$ value described above, thus will only give a surely satisfactory result under the prerequisite, that all parameters or factors used at the original setting of the relubrication interval are maintained unchanged.

SUMMARY OF THE INVENTION

The purpose of the present invention is to propose a new efficient method and a new improved system for establishing correct relubrication intervals and executing correct relubrication for a number of bearings preferably relubricated by an automatic lubrication system, whereby changes are automatically effected at variations in such factors as load, temperature and rotational speed.

A first exemplary embodiment presents a method for establishing and executing correct automatic relubrication for a number of bearings incorporated in a grease lubrication system, wherein initial values for the relubrication interval $t_f$ and/or lubricant volume are calculated and established according to empirical methods, data regarding bearing load, bearing temperature and bearing rotational speed are collected from the number of bearing assemblies during operation, using the data for calculating a value for current lubrication interval $t_f$, comparing the initial value with the current value, and calculating a correct lubricant volume associated with a current relubrication interval $t_f$ independent of, if the current relubrication interval $t_f$ is equal to that initially established or not, supplying calculated current relubrication interval $t_f$ and lubricant volume to an automatic lubricating apparatus, and starting to calculate new initial values after performance of a lubrication sequence and inputting new current measured data regarding bearing load, bearing temperature and bearing rotational speed in an event of non-performance of a lubrication sequence.

A second exemplary embodiment presents a system for establishing and executing correct automatic relubrication for a number of bearings incorporated in a grease lubrication system, the system comprising:

a central processor unit;

a number of sensors provided in connection to bearing assemblies and adapted to measure temperature, load and rotational speed for the bearing assemblies;

a communication interface for transferring the values measured by the sensors to the central processing unit, wherein the values measured by the sensors includes bearing load, bearing temperature and bearing rotational speed are collected from the bearing assemblies during operation; and an instruction set providing operational directions to the central processor unit, the instruction set including an instruction step of utilizing the data for calculating a value for current lubrication interval $t_f$, and an instruction step of comparing the initial value with the current value, and calculating a correct lubricant volume associated with a current relubrication interval $t_f$; and an automatic lubrication apparatus in communication with the central processing unit, the automatic lubrication apparatus arranged to feed out the correct lubricant volume to the bearing assemblies in accordance with the calculated correct relubrication interval $t_f$ calculated by the central processing unit in accordance with the instruction set based upon the current values measured by the sensors.

BRIEF SUMMARY OF THE DRAWINGS

The invention will now be described with reference to the accompanying drawings which show a non-limiting example of embodiment thereof and in which:

FIG. 1 shows—as described hereabove—an example of a relubrication interval chart, used for establishing the correct initial relubrication intervals.

FIG. 2 is a flow chart showing the principle of the new system according to the invention, FIG. 3 is a flow chart illustrating an embodiment of the method according to the invention, and FIG. 4 is a flow chart illustrating a further embodiment of the method according to the invention.

DESCRIPTION OF THE PREFERRED EMBODIMENTS

As described above, at the earlier common method of establishing appropriate relubrication intervals for grease lubrication, is used a relubrication interval chart of the type illustrated in FIG. 1. With aid of such an implement it is possible to find the estimated relubrication interval $t_f$ for a number of bearings connected to the system operating at an expected temperature, at a predetermined load and at a rotational speed, which is substantially constant. The speed factor A is multiplied with the bearing factor $b_f$, which is depending on the bearing type and load conditions C/P.

In the example illustrated in FIG. 1 the $Ab_f$-value of a bearing is expected to be <<475000 and the C/P ratio=8, and when a vertical line is drawn from the $Ab_f$-axis to meet the curve representing the C/P ratio and a horizontal line is then drawn from the intersection between the C/P value and the $Ab_f$-value it is seen that the relubrication interval $t_f$ will be 1000 operating hours. As for instance a 15 degree increase in operating temperature above 70 degrees centigrade means that the relubrication interval should be half that obtained with the initial temperature, it is of course important that the temperature may not vary too much, and also that the other factors (load and rotational speed) during an operating period, as the $t_f$-values estimated with the earlier method could be drastically reduced if the operating conditions are altered.

In FIG. 2 is illustrated schematically a bearing assembly 1 equipped with a sensor 2 for measuring the bearing temperature in real time during the operation of the bearing assembly. Furthermore there is arranged a second sensor 3 arranged to detect the current load to which the bearing assembly is subjected, and finally, in the embodiment illustrated, there is also provided a third sensor 4 arranged to measure the rotational speed of the bearing assembly and to emit a signal representative for the speed. The values from all sensors 2, 3 and 4 are transmitted in appropriate manner by cable or by wireless transmission from the bearings to a processor unit 5, arranged to calculate in real-time the required relubrication interval, also referenced as a current anticipated relubrication interval, based on the just measured current values, or last calculated preceding anticipated value for the relubrication interval, for the parameters temperature, rotational speed and load, and to emit continuously or intermittently signals to an automatic lubricating apparatus 6, which is arranged to deliver to the individual bearings a dynamic volume of lubricant, thus calculated during operation.

In FIG. 3 is schematically shown a flow chart illustrating a first embodiment of the method according to the invention, performed by the processor unit 5. The method sequence is started at box 7 from where the sequence is transferred to box 8 where initial values are calculated, e.g., in the same manner as previously, i.e. with aid of a relubrication interval chart, as described and illustrated with reference to FIG. 1.

Data measured by the sensors 2, 3 and 4 in FIG. 2 are supplied at 9 and are inputted at 10, i.e. the current values for temperature, load and rotational speed to which the different portions of the bearing assemblies are subjected.

In box 11 a new interval $t_f$ is calculated and this new $t_f$ value is compared in box 12 with the initial $t_f$ value. If the new $t_f$ value differs from the initial $t_f$ value i.e. falling below the initial $t_f$ value, the new $t_f$ value is introduced after calculation in box 13 as a new current $t_f$ value. This new current $t_f$ value then is supplied to box 14, where a correct amount of lubricant is calculated for the current $t_f$ value.

In the event that the calculated $t_f$ value is not smaller than the initial or current $t_f$ value, the initial or current $t_f$ value is supplied directly to the box 14.

The current relubrication interval $t_f$ and the amount of lubricant required is output from box 15 to a comparison box in 16 where the current time is compared to the value of the interval $t_f$ received from box 15.

If the actual time and the preset relubrication interval time coincide, information is outputted to the box 17, from which is delivered a lubrication impulse to the automatic lubrication apparatus 6 shown in FIG. 2, and from this position the sequence is restarted after an impulse is issued to box 8.

If there is a difference between the actual time and the calculated relubrication interval $t_f$>the comparison box emits a signal to box 10 for inputting load, temperature and speed values representing the instantaneous conditions, delivered by the box 9. After such a signal has been sent out and the current data has been inputted, the sequence is repeated via the boxes 11-16. The sequence includes the steps of collecting data, using the current data, and comparing the current anticipated value until the automatic lubrication apparatus provides lubricant to the bearing.

The input data required can be read continuously or intermittently and the signals emitted by the box 15 are preferably delivered to an electromagnetic valve of any appropriate type.

FIG. 4 illustrates a flow chart of a further embodiment of a method according to the invention.

After start of the system in this case there is made a calculation of initial values in box 18, whereupon load, speed and temperature variables are inputted in 19, together with details of current running condition, which are introduced from box 20.

In box 21, runtime calculations are performed to establish a new $t_f$ value, and in box 22 this new $t_f$ value is compared to actual $t_f$ value. If the result of this calculation is that the new value is smaller than the actual, then the new $t_f$ value is entered in box 23 as current actual $t_f$ value, and if not the "old" actual $t_f$ value is inserted in box 24, where the grease amount required is calculated and set. In the event the comparison in box 22 results in a "Yes", the new actual $t_f$ value as obtained in box 23 is used for the grease amount calculation in box 24. The current values from box 24 are displayed in box 25, and in box 26 it is considered if it is time to relubricate or not. If the comparison results in a "No", a new calculating process is initiated in box 19. If the comparison in box 26 results in a "Yes" in box 27 it is established if the last set grease amount is bigger than the minimum amount that the system can deliver in a relubrication cycle. In such case the relubrication is performed at 28 and the amount is returned to box 29 in which it is established whether the maximum grease amount is reached or not. If this comparison is positive in box 30 is displayed message regarding removing grease and requiring reset, whereas at a negative result, i.e. if the maximum grease amount has not been reached. The sequence is again returned to box 19 for start of a new relubrication cycle. If the result of the comparison in box 27 is negative, i.e. the last set lubricant amount is not bigger than the minimum amount the system can deliver, it is first established in box 31 if the maximum cycles of withhold lubrication has been reached. If the result from this comparison is "Yes" at 32 a relubrication is forced and the amount is returned to box 29. In case of a "No" at this location in box 33 is initiated that the relubrication should not be executed and the number of hold the relubrication cycles is incremented. The sequence thereupon is continued in box 29.

In this embodiment thus the system will check if the last set amount of grease is larger than the minimum amount the system can deliver in a relubrication cycle. If the last set amount is greater than the minimum amount, the system will trigger a relubrication sequence and add the amount of grease to a "grease amount variable" (box 29).

If the last set amount of grease is lower than the minimum amount, the system will hold the lubrication cycle for the next time, but this can only be effected for a preset number of times.

If the maximum number of hold cycles is reached, the system will act for enforcing a relubrication and add the amount to the "grease amount variable".

Before returning to the main loop, the system will check the total amount of lubricant, which has been supplied to the bearing, "grease amount variable" against a "maximum grease amount variable".

When the maximum amount has been reached, the system will enter a never ending loop, telling the operator to stop, clean and reset.

With methods and systems as described hereinabove, the problem associated with incorrect input data regarding load, temperature and rotational speed at determination of lubrication interval is eliminated.

The method and system further makes it possible to apply a dynamically adjustable lubrication interval and/or an adjustable lubricant quantity during operation of the bearing assemblies associated with the system.

The invention claimed is:

1. A method for establishing and executing correct automatic relubrication for at least one bearing incorporated in a grease lubrication system, wherein initial values for at least one of a relubrication interval and a lubricant volume is calculated and established according to empirical methods, comprising the steps of:
    collecting current data regarding at least one of a bearing load, a bearing temperature, and a bearing rotational speed is collected from the at least one bearing during operation,
    using the current data collected from the at least one bearing to calculate a current anticipated value for the relubrication interval,
    comparing the current anticipated value with a last calculated preceding anticipated value for the relubrication interval to generate a current anticipated relubrication interval,
    calculating, a correct lubricant volume based on the current anticipated relubrication interval,
    supplying the current anticipated relubrication interval and the correct lubricant volume to an automatic lubricating apparatus,
comparing the current anticipated relubrication interval with an actual time, and
    repeating the steps of collecting current data, using the current data, and comparing the current anticipated value until the current anticipated relubrication interval is less than or equal to the actual time at which time the automatic lubrication apparatus provides the correct lubricant volume of lubricant to the at least one bearing.

2. A method as recited in claim 1, wherein the step of collecting current data regarding bearing load, bearing temperature and bearing rotational speed are performed at the at least one bearing continuously during operation of the system.

3. A method as recited in claim 1, wherein the step of collecting current data regarding bearing load, bearing temperature and bearing rotational speed are performed at the different bearing assemblies intermittently during operation of the system.

4. A method as recited in claim 3, wherein the step of collecting current data regarding bearing load, bearing temperature and bearing rotational speed are performed at pre-established time intervals.

5. A method as recited in claim 1, wherein if a last amount of grease set is larger than a minimum amount the system can deliver in a relubrication cycle, a relubrication sequence is triggered.

6. A method as recited in claim 1, wherein a recirculation sequence is withheld for a pre-set number of times if a last amount of grease set is smaller than a minimum amount the system can deliver in a relubrication cycle.

7. The method of claim 1, further comprising calculating new initial values for use as the last measured preceding data and the last calculated preceding anticipated value for use in conjunction with the collecting of data during a next data collection sequentially after the provision of lubricant to the at least one bearing assembly by the automatic lubrication apparatus.

8. A system for establishing and executing correct automatic relubrication for at least one bearing incorporated in a grease lubrication system, the system comprising:
    a central processor unit,
    a number of sensors provided in connection to the at least one bearing and adapted to measure at least one of a temperature, a load and a rotational speed for the at least one bearing, thereby collecting current data,
    a communication interface for transferring the current data from the sensors to the central processor unit wherein the current data measured by the sensors includes bearing load, bearing temperature and bearing rotational speed are collected from during operation,
    an instruction set providing operational directions to the central processor unit, the instruction set including
        an instruction step of utilizing the current data collected from the at least one bearing for calculating a current anticipated value for a current relubrication interval,
        an instruction step of comparing the current anticipated value with a last calculated preceding anticipated value to generate a current anticipated relubrication interval,
        an instruction step of calculating a correct lubricant volume based on the current anticipated relubrication interval, and
        an instruction step of comparing the current anticipated relubrication interval with an actual time; and
    an automatic lubrication apparatus in communication with the central processor unit, the automatic lubrication apparatus arranged to feed out a correct volume of grease to the at least one bearing when the current anticipated relubrication interval is less than or equal to the actual time.

9. A system for establishing and executing correct automatic relubrication for at least one bearing incorporated in a grease lubrication system as recited in claim 8, wherein said instruction set further comprises an instruction step of starting to calculate new initial values after performance of a lubrication sequence and inputting new current measured data regarding bearing load, bearing temperature and bearing rotational speed in an event of non-performance of a lubrication sequence.

* * * * *